US011551177B2

(12) United States Patent
Banerjee

(10) Patent No.: US 11,551,177 B2
(45) Date of Patent: Jan. 10, 2023

(54) METHOD AND SYSTEM FOR HANDLING SOURCE FIELD AND KEY PERFORMANCE INDICATOR CALCULATION CHANGES

(71) Applicant: Tata Consultancy Services Limited, Mumbai (IN)

(72) Inventor: Subhodeep Banerjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 131 days.

(21) Appl. No.: 17/118,787

(22) Filed: Dec. 11, 2020

(65) Prior Publication Data
US 2021/0406802 A1 Dec. 30, 2021

(30) Foreign Application Priority Data
Jun. 29, 2020 (IN) .............................. 202021027586

(51) Int. Cl.
G06Q 10/06 (2012.01)
G06F 3/048 (2013.01)
G06F 16/28 (2019.01)
G06F 16/22 (2019.01)
G06F 16/21 (2019.01)

(52) U.S. Cl.
CPC ....... G06Q 10/06393 (2013.01); G06F 3/048 (2013.01); G06F 16/21 (2019.01); G06F 16/2282 (2019.01); G06F 16/283 (2019.01)

(58) Field of Classification Search
CPC .............................................. G06Q 10/06393
See application file for complete search history.

(56) References Cited

U.S. PATENT DOCUMENTS

| 6,212,524 | B1 | 4/2001 | Weissman et al. |
| 9,521,052 | B1 * | 12/2016 | Nandyalam ......... G06F 11/3003 |
| 9,705,751 | B1 * | 7/2017 | Yi ....................... H04L 41/0823 |
| 11,296,955 | B1 * | 4/2022 | Fletcher ........... G06Q 10/06393 |
| 2004/0230977 | A1 * | 11/2004 | Kraiss .................... G06Q 99/00 |
| | | | 718/100 |

(Continued)

OTHER PUBLICATIONS

Navin K. Dev et al., Multi-criteria evaluation of real-time key performance indicators of supply chain with consideration of big data architecture, Computers & Industrial Engineering 128 (2019) 1076-1087 (Year: 2018).*

(Continued)

*Primary Examiner* — Andre D Boyce
(74) *Attorney, Agent, or Firm* — Finnegan, Henderson, Farabow, Garrett & Dunner LLP

(57) ABSTRACT

Most of the business intelligence and analytics applications uses a data model. Any change in the source field or in the key performance indicator (KPI) calculation changes result in long turn-around time and complex changes in the background coding of the data model. A method and system for handling the source field change and the key performance indicator (KPI) calculation change in the data model has been provided. The disclosure provides a data modelling design, in particular, for handling source field changes or additions and target KPI calculation changes without any impact on the data model. The solution section is divided in two areas so as to tackle the technical problem statement points. First part is the data ingestion and second is data reporting.

8 Claims, 5 Drawing Sheets

(56) References Cited

U.S. PATENT DOCUMENTS

| | | | | |
|---|---|---|---|---|
| 2012/0011487 | A1* | 1/2012 | Matsumoto | G06F 11/3668 |
| | | | | 717/104 |
| 2016/0180266 | A1* | 6/2016 | Palani | G06Q 10/0637 |
| | | | | 705/7.36 |
| 2016/0292256 | A1* | 10/2016 | Chode | G06F 16/27 |
| 2016/0320768 | A1* | 11/2016 | Zhao | G05B 17/02 |
| 2018/0032940 | A1* | 2/2018 | Trenchard | G06Q 10/067 |
| 2018/0218053 | A1* | 8/2018 | Koneru | G06F 3/0482 |
| 2018/0270126 | A1* | 9/2018 | Tapia | H04L 41/5009 |
| 2018/0348717 | A1* | 12/2018 | Zhao | G06N 5/02 |
| 2020/0177611 | A1* | 6/2020 | Bharrat | H04L 43/045 |
| 2021/0117852 | A1* | 4/2021 | Ganesh | G06N 20/10 |
| 2021/0201202 | A1* | 7/2021 | Simhon | G06N 3/0454 |
| 2021/0383271 | A1* | 12/2021 | Slinger | G06F 11/3409 |

OTHER PUBLICATIONS

Alejandro Maté et al., Specification and derivation of key performance indicators for business analytics: A semantic approach, Data & Knowledge Engineering 108 (2017) 30-49 (Year: 2017).*

Title: Introduction to Dimensional Modelling for Data Warehousing Title of the item: The Mine of Information Date: 2018 Publisher: vonos.net Link: http://moi.vonos.net/programming/dwh-dimensional/.

Title: DAX in tabular models Title of the item: Tabular modeling Date: 2019 Publisher: Microsoft Link: https://docs.microsoft.com/en-us/analysis-services/tabular-models/understanding-dax-in-tabular-models-ssas-tabular?view=asallproducts-allversions.

* cited by examiner

METHOD AND SYSTEM FOR HANDLING SOURCE FIELD AND KEY PERFORMANCE INDICATOR CALCULATION CHANGES

PRIORITY CLAIM

This U.S. patent application claims priority under 35 U.S.C. § 119 to: India Application No. 202021027586, filed on Jun. 29, 2020. The entire contents of the aforementioned application are incorporated herein by reference.

TECHNICAL FIELD

The disclosure herein generally relates to field of data modelling design, and, more particularly, to a method and a system for handling multiple variations in source field and key performance indicator (KPI) calculation changes in a data model.

BACKGROUND

Data models are backbones to any Business Intelligence and analytical (BInA) systems and define the referential integrity of the transaction data with the corresponding master data.

While an online transaction processing (OLTP) or transaction systems like enterprise resource planning (ERP) or salesforce record the transactional data, the data is analyzed from the Data warehouse in BInA applications. A DataMart is a simple form of a data warehouse that is focused on a single subject (or functional area), such as sales or finance or marketing. The DataMart transforms the raw data from the OLTP databases and supports queries at a much higher level than the OLTP atomic transaction queries. The DataMart should be supported by a logical and physical data model to execute the above functionality.

Multi-dimensional DataMarts are one kind of DataMart. Multi-dimensional DataMarts rely on a dimension modeling technique to define the schema for the DataMart. The dimension modeling involves visualizing the data in the DataMart as a multi-dimension data space (e.g., image the data as a cube). Each dimension of that space corresponds to a different way of looking at the data. In the multi-dimensional DataMart, the data is typically organized as a star schema. At the center of the star schema is a fact table that contains measure data. Radiating outward from the fact table, are multiple dimension tables. Dimension tables contain attribute data, such as the names of customers and territories. The fact table is connected, or joined, to each of the dimension tables, but the dimension tables are connected only to the fact table. Companies invest much on achieving and stabilizing an enterprise data model which will support their a) Source data variations in structures and frequencies of data availability b) Target metrics and key performance indicators (KPIs) calculation achieved through fact-dimension bindings and roll-up, drill-down on dimensions.

This segregation of the data models into subject area wise data model concept have evolved due to this risk containing strategy. Even then in same subject area companies are creating multiple fact layers, conformed dimensions and bridge tables when there is optimization possible both in design and performance to enrich the same data model when they share same dimension grains.

On the reporting side, the KPIs being defined can change over time and users need new ad-hoc calculations on the go to scenario test something. This is somewhat possible in a reporting tool via import to cache/virtualization but the effect is on the cache size of reports making them slow. The ability of self service by users to change/trickle with KPI calculations at the same use the power of the DB platform is not available inbuilt.

SUMMARY

Embodiments of the present disclosure present technological improvements as solutions to one or more of the above-mentioned technical problems recognized by the inventors in conventional systems. For example, in one embodiment, a system for handling a source field change and a key performance indicator (KPI) calculation change in a data model is provided. The system comprises an input/output interface, one or more hardware processors and a memory. The input/output interface provides the data model as an input, wherein the data model having a plurality of fact tables and a plurality of dimension tables, wherein the plurality of dimension table comprises a plurality of attributes, and the plurality of fact tables having a plurality of fields. The memory in communication with the one or more hardware processors, wherein the one or more first hardware processors are configured to execute programmed instructions stored in the one or more first memories, to: provide one or more new source fields, wherein the one or more new source fields to be amended in one of a fact table from amongst the plurality of fact tables; add one or more component keys and one or more component values respective to each of the one or more component keys in the fact table corresponding to the one or more new source fields; store the one or more component keys in a new row of a component table, wherein the component table further stores description of the one or more component keys; provide a KPI table, wherein the KPI table comprising a plurality of KPI calculations, wherein the KPI table is controlled by a user using a graphic user interface (GUI); provide one or more new key performance indicator (KPI) calculations to be reported via the data model, wherein the new KPI calculations is one or more of the plurality of KPI calculations in the KPI table and the new KPI calculation is made of one or more components; perform calculation corresponding to the new KPI calculation using a generic algorithm and a relational bridge table, wherein the generic algorithm is available in the data model, the relational bridge table provides a sequence for each of the one or more components in the new KPI calculation, wherein the sequence designates an order of the components to be used in the new KPI calculation; and report the calculated new KPI calculation on the GUI.

In another aspect, a method for handling a source field change and a key performance indicator (KPI) calculation change in a data model is provided. Initially, the data model is provided as an input wherein the data model comprising a plurality of fact tables and a plurality of dimension tables, wherein the plurality of dimension table comprises a plurality of attributes, and the plurality of fact tables comprising a plurality of fields. Later, one or more new source fields are provided wherein the one or more new source fields to be amended in one of a fact table from amongst the plurality of fact tables. At next step, one or more component keys and one or more component values are added respective to each of the one or more component keys in the fact table corresponding to the one or more new source fields. Further, the one or more component keys is stored in a new row of a component table, wherein the component table further stores description of the one or more component keys. In the next step, a KPI table is provided, wherein the KPI table comprising a plurality of KPI calculations, wherein the KPI table is controlled by a user using a graphic user interface (GUI). Further, one or more new key performance indicator (KPI) calculations to be reported via the data model are provided, wherein the new KPI calculations is one or more of the plurality of KPI calculations in the KPI table and the new KPI calculation is made of one or more components. Later, calculation is performed corresponding to the new KPI calculation using a generic algorithm and a relational bridge table, wherein the generic algorithm is available in the data model, the relational bridge table provides a sequence for each of the one or more components in the new KPI calculation, wherein the sequence designates an order of the components to be used in the new KPI calculation. And finally, the calculated new KPI calculation is reported on the GUI.

In another aspect the embodiment here provides one or more non-transitory machine readable information storage mediums comprising one or more instructions which when executed by one or more hardware processors cause handling a source field change and a key performance indicator (KPI) calculation change in a data model. Initially, the data model is provided as an input wherein the data model comprising a plurality of fact tables and a plurality of dimension tables, wherein the plurality of dimension table comprises a plurality of attributes, and the plurality of fact tables comprising a plurality of fields. Later, one or more new source fields are provided wherein the one or more new source fields to be amended in one of a fact table from amongst the plurality of fact tables. At next step, one or more component keys and one or more component values are added respective to each of the one or more component keys in the fact table corresponding to the one or more new source fields. Further, the one or more component keys is stored in a new row of a component table, wherein the component table further stores description of the one or more component keys. In the next step, a KPI table is provided, wherein the KPI table comprising a plurality of KPI calculations, wherein the KPI table is controlled by a user using a graphic user interface (GUI). Further, one or more new key performance indicator (KPI) calculations to be reported via the data model are provided, wherein the new KPI calculations is one or more of the plurality of KPI calculations in the KPI table and the new KPI calculation is made of one or more components. Later, calculation is performed corresponding to the new KPI calculation using a generic algorithm and a relational bridge table, wherein the generic algorithm is available in the data model, the relational bridge table provides a sequence for each of the one or more components in the new KPI calculation, wherein the sequence designates an order of the components to be used in the new KPI calculation. And finally, the calculated new KPI calculation is reported on the GUI.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The current design of most of the enterprise data models has fact-dimension relationship where fact contains the quantifiable measurements/metrics from a business process like sales volume, sales value or inventory quantity and linked through keys with the relevant dimension which provides the context surrounding a business process.

Figure 1:
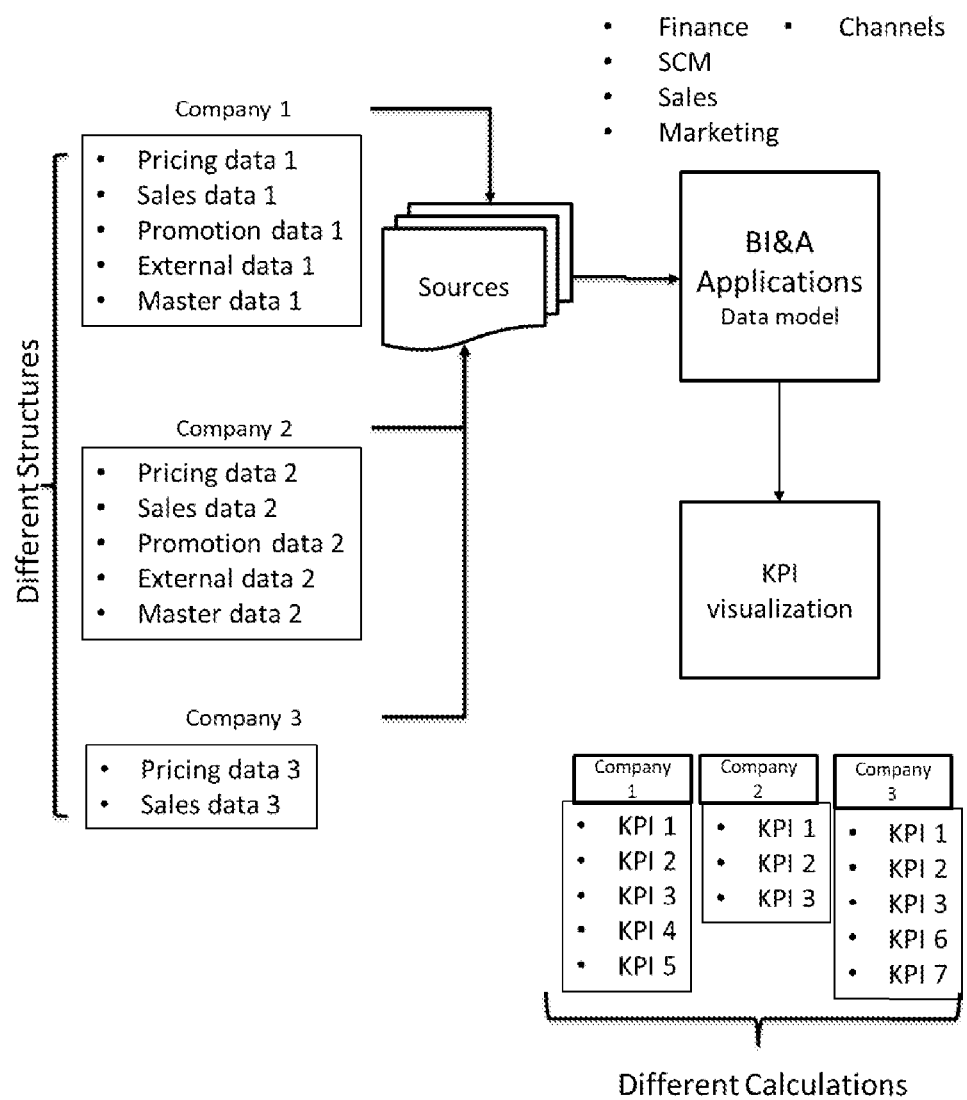
FIG. 1 illustrates an example of an existing data model along with sources and key performance indicators (KPI) visualization utilized by multiple companies.

An example of an existing data model along with sources and KPI visualization utilized by multiple companies, namely, company 1, company 2 and company 3, that is shown in FIG. 1. The example shows three companies have different set of source fields. All these source fields are collected by a single data model. The data model can be used various BI&A applications such as finance, sales, marketing, channels etc. Further, this data model is also configured to report the KPIs in the output. The three companies can have three different set of KPIs which they want to visualize or report as the output. And each KPI has a different calculation for them. There are multiple problems associated with this type of models. The problems comprise varied data source structures, varied data sources, different KPI calculations, evolution of additional external sources, modular implementations across markets etc.

Further, the changes in the source fields and KPI also impacts the output. The various impacts comprise high cost of customization, longer sales cycle, no flexibility for customers to implement in phases/features, do not support evolution of additional sources or self-service requires additional investments etc.

Enterprise solutions especially in business intelligence & analytics (BI&A) area are heavily dependent on a stable data model to consolidate the data collected across sources and reporting needs. In case a new quantifiable value (henceforth called measures) is obtained as a field from sources which business wants to record for their reporting purpose, there is no room in existing fact table structure resulting in creation of either new fact table or changing the existing fact table both of which are time taking and risk to the existing data layer. While in the existing there are risks involved when a new source comes and the data structure has to be changed with a significant downtime to refresh the data after changes in structure or performance regression testing on downstream applications and reporting. Data modelers across enterprises struggle to handle the grain and referential integrity of the new field/fact table keeping in line with the existing design principles and performance limits.

While in the reporting side, the KPIs being defined can change over time and users need new ad-hoc calculations on the go to scenario test something. If the users need some changes in the formulae for a new KPI or want to integrate new fields in the formulae, they cannot do it in DB layer. This is somewhat possible in a reporting tool but the effect is on the cache size of reports making them slow. The ability of self service by users to change/trickle with KPI calculations at the same use the power of the DB platform is not available inbuilt and companies to handle this are investing on data virtualization software's. This feature gap is becoming more evident as enterprises wants to integrate external data and as much multiple data sources frequently to enhance decision making. Data model or reporting solutions do not allow these changes without undergoing change management and risk mitigation on other regressions areas.

An embodiment provides a technical solution to the above technical problem by proposing a method and system that allows the enterprise to absorb and expedite any source changes without changing the enterprise data models. The disclosure enables end users to create or change their algorithms or KPI calculation based on their business needs without worrying about long technical turnarounds or change management needed while modifying data model changes.

According to an embodiment of the disclosure, a system 100 for handling a source field change and a key performance indicator (KPI) calculation change in a data model has been provided. The disclosure provides a data modelling design, in particular, for handling source field changes or additions and target KPI calculation changes without any impact on the data model. In an example the data model is a "single fact" based where the need for table structure changes with new requirements will be null. The single fact table concept is creating a new way of storing data on top of existing data model. The fact table design is changed so that the table structure does not have to change every time a new field is introduced. The solution section is divided in two areas so as to tackle the technical problem statement points in the above section. First part is the data ingestion and second is data reporting.

Referring now to the drawings, and more particularly to FIG. 2 through FIG. 4B, where similar reference characters denote corresponding features consistently throughout the figures, there are shown preferred embodiments and these embodiments are described in the context of the following exemplary system and/or method.

Figure 2:
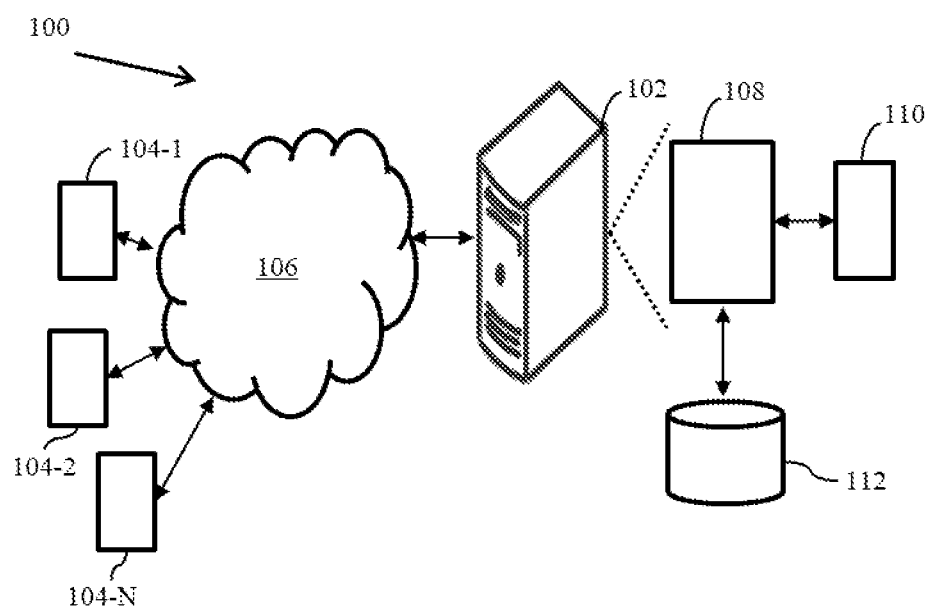
FIG. 2 illustrates a block diagram of a system for handling a source field change and a key performance indicator (KPI) calculation change in a data model according to some embodiments of the present disclosure.

FIG. 2 illustrates a block diagram of the system 100 for handling the source field change and the key performance indicator (KPI) calculation change in the data model, in accordance with an example embodiment of the present disclosure. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104 or user interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 3:
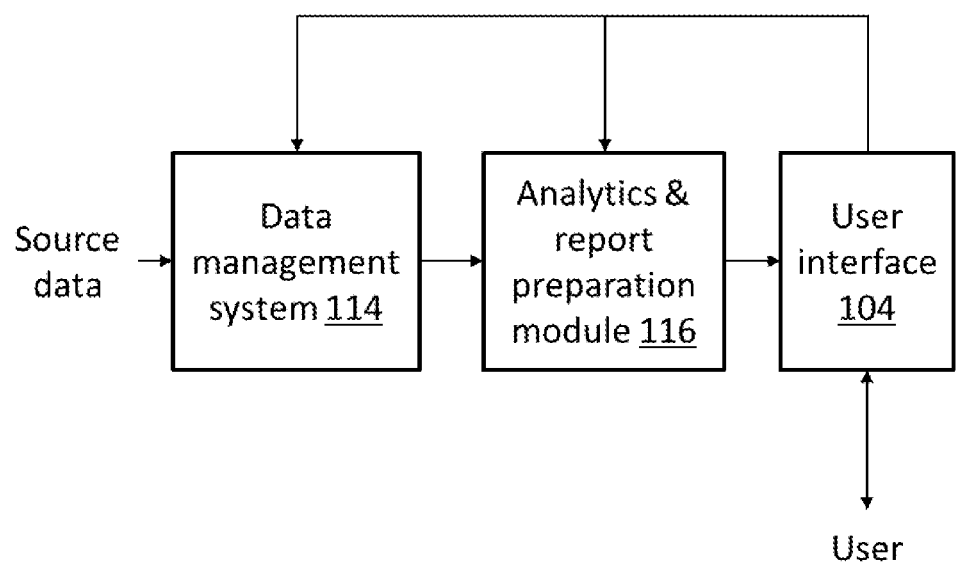
FIG. 3 shows a block diagram of a data management system to be utilized by the system of FIG. 1 according to some embodiments of the present disclosure.

FIG. 3 is a block diagram illustrating an overview of a data management system 114 to be utilized in the system 100. In one embodiment of the present disclosure, a data management system 114 and analytics and report preparation module 116 are provided for qualifying and analyzing data for at least one business intelligence and analytical (BI&A) application. A platform is provided that receives source data. The data management system 114 transforms raw source data and stores it in the data repository 112. The analysis and report preparation module 116 includes an analytic engine. The source data can be imported to a data warehouse which is the part of the data management system 114. The data in data warehouse is assigned, associated, classified, scaled, validated, and archived for future use. The source data is then combined with internal source data (data from previous projects) and received at an analysis and report preparation module 116 for analytical interpretation, modeling, and report preparation. The analysis and report preparation module 116 may be configured to perform KPI calculations.

Figure 4A:
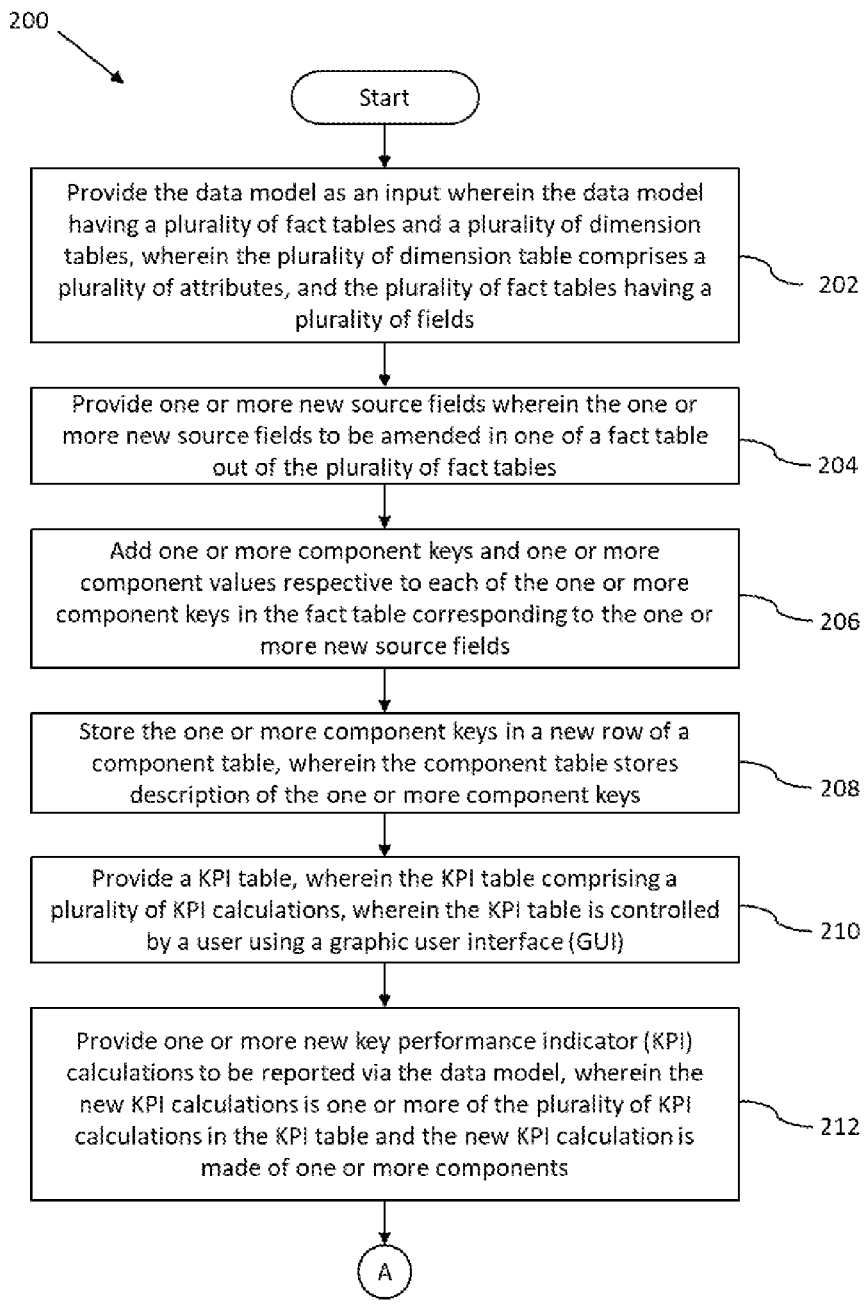
FIGS. 4A and 4B illustrate flowcharts showing the steps involved in handling multiple variations in source field and a key performance indicator (KPI) calculation change in a data model according to some embodiments of the present disclosure.
Figure 4B:
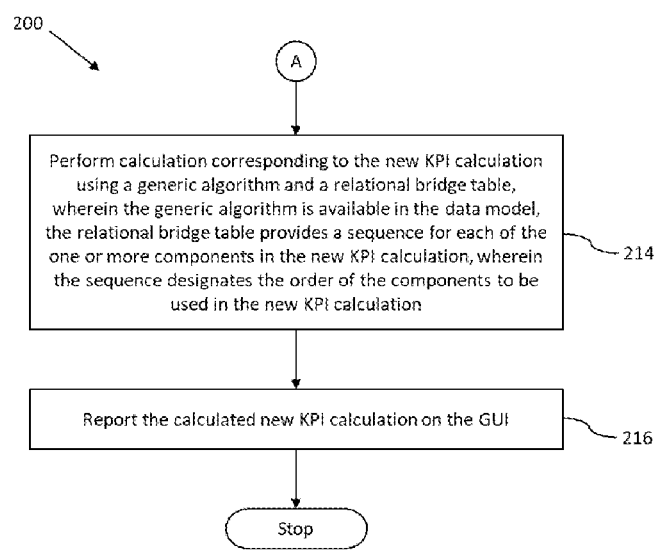

In operation, a method 200 for handling the source field change and the key performance indicator (KPI) calculation change in the data model is shown in the flowchart of FIG. 4A-4B. The data model supports configuration of new components and KPI's through common user interface and can support multiple customers varied requests.

Initially at step 202, the data model is provided as an input via the I/O interface 104. The data model having a plurality of fact tables and a plurality of dimension tables. The plurality of dimension table comprises a plurality of attributes, and the plurality of fact tables having a plurality of fields. The example of the fact table and dimension table is shown in the later part of the disclosure. Further at step 204, one or more new source fields are provided. The one or more new source fields are provided to be amended in one of a fact table out of the plurality of fact tables. The one or more new sources may comprise a plurality of scenarios such as a new data comes in existing fields, a new field introduced in the source fields, a new source table is identified or a new source with multiple source tables is required. The system 100 is configured to cover all the mentioned scenarios.

At step 206, one or more component keys and one or more component values respective to each of the one or more component keys are added in the fact table corresponding to the one or more new source fields. The one or more component keys and one or more component values represent measures in the fact table where the count of measures is more than one.

At step 208, the one or more component keys are stored in a new row of a component table, wherein the component table stores description of the one or more component keys. Thus, one or more new source field is ingested without any changes in the background section of the data model.

The system 100 provides a single field for measures (quantifiable value) which are quantifiable fields in the fact table and add one or more component key to contextualize the fact measure i.e. for the component this value signifies. The changes in the fact table where value of any measure is held is highlighted and the measure details (whose value it is) is maintained in the component table.

The data ingestion can also be explained with the help of an example. If the value is 10, it can be related to multiple component descriptions like sales volume or inventory quantity or even different streams like vendor payment or cash flow depending on the context set by component key. The sample depiction of the fact entries handling multiple types of values is shown below in TABLE 1.

TABLE 1

Sample depiction of fact entries handling multiple types of values in a fact table

| Product   | Customer   | Location   | Component Key   | Value |
|-----------|------------|------------|-----------------|-------|
| Product 1 | Customer 1 | Location 1 | Component Key 1 | 10    |
| Product 1 | Customer 1 | Location 1 | Component Key 2 | 12    |
| Product 1 | Customer 1 | Location 1 | Component Key 3 | 14    |
| Product 1 | Customer 1 | Location 1 | Component Key 4 | 20    |

Where component Key which qualifies the values are stored in component table as shown below in TABLE 2.

TABLE 2

Sample component table showing component keys

| Component Key   | Component Description |
|-----------------|-----------------------|
| Component Key 1 | Sales Volume          |
| Component Key 2 | Sales Value           |
| Component Key 3 | Inventory Value       |
| Component Key 4 | Cash flow             |

Multiple measures coming from source can be mapped and loaded in this fact table with same grain as possible in current data model design.

According to an embodiment of the disclosure, the model with single fact will remove the need of multiple conformed layers to handle multiple facts and the relationship complexities therein. This can be scalable for future requirements and source system varieties. A platform with this data model will be agnostic of source business data changes and data variety as it can ingest additional sources and fields any time and can enable template driven expedited deployment.

Further at step 210, a key performance indicator table (KPI) is provided, the KPI table comprises a plurality of KPI calculations, wherein the KPI table is controlled by a user using a graphic user interface (GUI). The KPI table further comprises KPI information, KPI suite, KPI family and algorithm type key. The KPI table can be present on tool which is accessible to the user from the front end via the I/O interface 104.

At step 212, one or more new key performance indicator (KPI) calculations to be reported via the data model are provided. The new KPI calculations is one or more of the plurality of KPI calculations in the KPI table and the new KPI calculation is made of one or more components. The one or more KPI calculation comprises a plurality of scenarios such as a reporting with planned KPIs, changes in the KPI calculations, a new KPI formulae corresponding to the ingested one or more new source fields or a new KPI formulae with existing fields. The system 100 is configured to cover all the mentioned scenarios of the KPI calculation reporting.

At step 214, calculations are performed corresponding to the new KPI calculation using a generic algorithm and a relational bridge table. The generic algorithm comprises a plurality of sequences. For the generic algorithm, there are multiple algorithms possible and based on the complexity of operators the algorithm can be populated. The generic algorithm is available in the data model, the relational bridge table provides a sequence for each of the one or more components in the new KPI calculation, wherein the sequence designates the order of the components to be used in the new KPI calculation. The relational bridge table comprises component key, KPI key and sequence number to control the KPI calculation. And finally at step 216, the calculated new KPI calculation is reported on the GUI. The proposed component table which qualifies the fact measures can be extended to a separate KPI table with use of a relation bridge table.

According to an embodiment of the disclosure, the new KPI calculation of the system 100 can also be explained with the help of an example as follows. TABLE 1 shows the fact table and TABLE 3 shows a sample component table. TABLE 3 shows various input components along with the component key and unit of measure.

TABLE 3

A sample representation of component table

| Component Key | Input                       | Unit of measure (UoM) |
|---------------|-----------------------------|-----------------------|
| 1             | Volume produced             | £                     |
| 2             | No. of man hours            | £                     |
| 3             | Cost of personnel - direct  | £                     |
| 4             | Cost of personnel - indirect| £                     |
| 5             | Cost of maintenance         | £                     |
| 6             | Cost of R&M                 | £                     |
| 7             | Cost of utilities           | £                     |

TABLE 3-continued

A sample representation of component table

| Component Key | Input | Unit of measure (UoM) |
|---|---|---|
| 8 | Cost of water | £ |
| 9 | Cost of energy | £ |
| 10 | Cost of depreciation | £ |
| 11 | Cost of other | £ |
| 12 | Cost of OH supplies | £ |
| 13 | Cost of outside services | £ |
| 14 | Cost of insurance/Tax | £ |

The user can edit or insert new KPI details and provide formula in the KPI table to be written back from any GUI. They can change any existing KPI formulae also. The sample representation of KPI table is shown below in TABLE 4

TABLE 4

Sample representation of a KPI table

| KPI ID | KPI Level | Suite | Output | UoM | Calculation |
|---|---|---|---|---|---|
| 1 | L1 | Cost | Cost of conversion | £/uom | ={(Input 3 + Input 4 + Input 5 + Input 7 + Input 10 + Input 11)/Input 1} |
| 2 | L2 | Cost | Cost of personnel | £/uom | ={(Input 3 + Input 4)/(Input 1)} |
| 3 | L3 | Cost | Cost of personnel - direct | £/uom | ={(Input 3)/(Input 1)} |
| 4 | L3 | Cost | Cost of personnel - indirect | £/uom | ={(Input 4)/(Input 1)} |
| 5 | L2 | Cost | Cost of maintenance | £/uom | ={(Input 5)/(Input 1)} |
| 6 | L3 | Cost | Cost of R&M | £/uom | ={(Input 6)/(Input 1)} |
| 7 | L2 | Cost | Cost of utilities | £/uom | ={(Input 7)/(Input 1)} |
| 8 | L3 | Cost | Cost of water | £/uom | ={(Input 8)/(Input 1)} |
| 9 | L3 | Cost | Cost of energy | £/uom | ={(Input 9)/(Input 1)} |
| 10 | L2 | Cost | Cost of depreciation | £/uom | ={(Input 10)/(Input 1)} |
| 11 | L2 | Cost | Cost of other | £/uom | ={(Input 11)/(Input 1)} |
| 12 | L3 | Cost | Cost of OH supplies | £/uom | ={(Input 12)/(Input 1)} |
| 13 | L3 | Cost | Cost of outside services | £/uom | ={(Input 13)/(Input 1)} |
| 14 | L3 | Cost | Cost of insurance/Tax | £/uom | ={(Input 14)/(Input 1)} |
| 15 | L3 | Cost | Cost of other - other | £/uom | ={[Input 11 − (Input 12 + Input 13 + Input 14)]/(Input 1)} |
| 16 | L1 | Emp. Prod | DE Made up output | £ | Input 3 |
| 17 | L2 | Emp. Prod | Employee productivity | Uom/man hour | ={(Input 1)/(Input 2)} |
| 18 | L1 | | Personnel spend per man hour | £/man hour | =(Input 3 + Input 4)/(Input 2) |

Further, the relational bridge table contains component key, KPI key and sequence number to control the calculations. A sample relational bridge table is depicted below in TABLE 5.

TABLE 5

A sample representation of a relational bridge table

| KPI | Component | Sequence | Example values | Calculation | Detail calculation |
|---|---|---|---|---|---|
| 1 | 3 | 1 | 10 | 62.79% | ((10 + 8 + 4 + 0 + 2 + 3) − 0 − 0 − 0)/(43 − 0 − 0) |
| 1 | 4 | 1 | 8 | | |
| 1 | 5 | 1 | 4 | | |
| 1 | 7 | 1 | 0 | | |
| 1 | 10 | 1 | 2 | | |
| 1 | 11 | 1 | 3 | | |
| 1 | 1 | 2 | 43 | | |
| 2 | 3 | 1 | 15 | 60% | ((15 + 45) − 0 − 0 − 0)/(100 − 0 − 0) |
| 2 | 4 | 1 | 45 | | |
| 2 | 1 | 2 | 100 | | |
| 15 | 11 | 1 | 90 | 70% | (90 − (5 + 5 + 10) − 0 − 0)/(100 − 0 − 0) |
| 15 | 12 | 3 | 5 | | |
| 15 | 13 | 3 | 5 | | |
| 15 | 14 | 3 | 10 | | |
| 15 | 1 | 2 | 100 | | |
| 16 | 3 | 1 | 77 | £77 | (77 − 0 − 0 − 0)/(1 − 0 − 0) |

There are generic algorithms available in the data model which calculates based on the sequence given for each component in a KPI calculation. In the present example, the generic algorithm is shown below:

$$\text{Generic algorithm} = \frac{((SumSEQ1 - isnull(SumSEQ3, 0)) - isnull(SumSEQ4, 0)) - isnull(SumSEQ5, 0)}{((isnull(sumSEQ2, 1) - isnull(SumSEQ6, 0)) - isnull(SumSEQ7, 0))} \quad (1)$$

Where, SumSEQN means summation of all the values provided in sequence N

The sequence designates the order of the components to be used in the generic calculation for the KPI. Changing sequence can have different effects on the KPI value based on user requirements. For example, as depicted above the KPI 2 is defined as Cost of Personnel with formula being $$\text{Cost of personnel} = \frac{(\text{Cost of Personnel} - \text{Direct} + \text{Cost of Personnel} - \text{Indirect})}{(\text{Volume produced})} \quad (2)$$

With the component key number in component table this will be $$\text{Cost of personnel} = \frac{(\text{Input 3} + \text{Input 4})}{(\text{Input 1})} \quad (3)$$

To achieve this KPI calculations users have to enter in the I/O interface the bridge table details for the KPI, component and the position of the component in the formula. Therefore, in the present example, the same can be shown below in TABLE 6.

TABLE 6

A sample representation of the table from the
I/O interface which is edited by the user.

| KPI | Component | Sequence |
|-----|-----------|----------|
| 2   | 3         | 1        |
| 2   | 4         | 1        |
| 2   | 1         | 2        |

Formula shown in equation (1) will be populated based on the sequence detail, i.e., $$KPI2 = \frac{SumSEQ1}{isnull(sumSEQ2, 1)} \text{ or,} \quad (4)$$

$$KPI2 = \frac{(\text{Component 3} + \text{Component 4})}{(\text{Component 1})}$$

If the users wants to change this to {(Component 3−Component 4)/(Component 1)} the user can change sequence number of component 4 from 1 to 4 making the system recalculate based on new formula.

In the same example if the user wants to add component 5 Cost of Maintenance in the KPI calculation which is a new field coming from new source, they can do by simply updating the sequence number from GUI as shown below in TABLE 7.

TABLE 7

A sample representation of the table from the I/O interface
in response to further editing by the user.

| KPI | Component | Sequence |
|-----|-----------|----------|
| 2   | 3         | 1        |
| 2   | 4         | 1        |
| 2   | 1         | 2        |
| 2   | 5         | 1        |

Thus, this will be translated to {(Component 3+Component 4+Component 5)/(Component 1)} without changing any codes or table structure and will give the confidence to the users on scenario testing with the fields available in database.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem long turn-around time and complex changes in the background coding of the data model in response to the addition of a new source field or any KPI calculation changes. The embodiment, thus provides the method and system for handling the source field change and the key performance indicator (KPI) calculation change in the data model.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for handling a source field change and a key performance indicator (KPI) calculation change in a data model, the method comprising:
   providing the data model as an input, via one or more hardware processors, wherein
      the data model comprises a plurality of fact tables and a plurality of dimension tables,
      the plurality of dimension tables comprises a plurality of attributes, and
      the plurality of fact tables comprises a plurality of fields;
   providing one or more new source fields, via the one or more hardware processors, wherein
      the one or more new source fields to be amended in a fact table of the plurality of fact tables, and
      the one or more new source fields comprises new data comes from existing fields and a new source with multiple source tables;
   adding, via the one or more hardware processors, one or more first component keys and one or more component values respective to each of one or more second component keys in the fact table corresponding to the one or more new source fields;
   storing, via the one or more hardware processors, the one or more first component keys in a new row of a component table, wherein
      the component table further stores a description of the one or more first component keys, and the one or more new source fields is ingested without any changes in a background section of the data model;

providing, via the one or more hardware processors, a single field for a quantifiable value which is quantifiable field in the fact table;

adding, via the one or more hardware processors, one or more third component keys to contextualize fact measures, wherein the contextualization indicates a significance of the quantifiable value with respect to a component of one or more components;

highlighting, via the one or more hardware processors, changes in the fact table where a value of the quantifiable value is held, wherein
the quantifiable value is maintained in the component table, and
the component table which qualifies the fact measures is extended to a separate KPI table with use of a relation bridge table;

providing a KPI table, via the one or more hardware processors, wherein
the KPI table comprising a plurality of KPI calculations, and
the KPI table is controlled by a user using a graphic user interface (GUI);

providing, via the one or more hardware processors, one or more new key performance indicator (KPI) calculations to be reported via the data model, wherein the one or more new KPI calculations includes the plurality of KPI calculations in the KPI table and a new KPI calculation is made of the one or more components;

performing calculation, via the one or more hardware processors, corresponding to the new KPI calculation using a generic algorithm and a relational bridge table, wherein
the relational bridge table comprises component key, KPI key, and a sequence number to control the new KPI calculation,
the generic algorithm is available in the data model,
the relational bridge table provides a sequence for each of the one or more components in the new KPI calculation, and
the sequence designates an order of the components to be used in the new KPI calculation; and reporting the calculated new KPI calculation on the GUI.

2. The method of claim 1, wherein the one or more first component keys and the one or more component values represent measures in the fact table where the count of the measures is more than one.

3. The method of claim 1, wherein the KPI table further comprises KPI information, a KPI suite, a KPI family and an algorithm type key.

4. The method of claim 1, wherein the one or more new source fields further comprises:
a new field introduced in the one or more new source fields, and
a new source table that is identified.

5. The method of claim 1, the plurality of KPI calculations comprises:
a reporting with planned KPIs,
changes in the plurality of KPI calculations,
a new KPI formulae corresponding to the ingested one or more new source fields, or
a new KPI formulae with existing fields.

6. The method of claim 1, wherein the generic algorithm comprises a plurality of sequences.

7. A system for handling a source field change and a key performance indicator (KPI) calculation change in a data model, the system comprising:
an input/output interface for providing the data model as an input, wherein
the data model having comprises a plurality of fact tables and a plurality of dimension tables,
the plurality of dimension tables comprises a plurality of attributes, and
the plurality of fact tables comprises a plurality of fields;

one or more hardware processors;

a memory in communication with the one or more hardware processors, wherein the one or more hardware processors are configured to execute programmed instructions stored in the memory to:
provide one or more new source fields, wherein
the one or more new source fields to be amended in fact table of the plurality of fact tables, and
the one or more new source fields comprises new data comes from existing fields and a new source with multiple source tables;

add one or more first component keys and one or more component values respective to each of one or more second component keys in the fact table corresponding to the one or more new source fields;

store the one or more first component keys in a new row of a component table, wherein
the component table further stores a description of the one or more first component keys, and
the one or more new source fields is ingested without any changes in a background section of the data model;

provide a single field for a quantifiable value which is quantifiable field in the fact table;

add one or more third component keys to contextualize fact measures, wherein the contextualization indicates a significance of the quantifiable value with respect to a component of one or more components;

highlight changes in the fact table where a value of the quantifiable value is held,
wherein
the quantifiable value is maintained in the component table, and
the component table which qualifies the fact measures is extended to a separate KPI table with use of a relation bridge table;

provide a KPI table, wherein
the KPI table comprising a plurality of KPI calculations, and wherein
the KPI table is controlled by a user using a graphic user interface (GUI);

provide one or more new key performance indicator (KPI) calculations to be reported via the data model, wherein the one or more new KPI calculations includes the plurality of KPI calculations in the KPI table and a new KPI calculation is made of the one or more components;

perform calculation corresponding to the new KPI calculation using a generic algorithm and a relational bridge table, wherein
the relational bridge table comprises component key, KPI key, and a sequence number to control the new KPI calculation,
the generic algorithm is available in the data model, the relational bridge table provides a sequence for each of the one or more components in the new KPI calculation, and the sequence designates an order of the components to be used in the new KPI calculation; and report the calculated new KPI calculation on the GUI.

8. One or more non-transitory machine readable information storage mediums comprising one or more instructions which when executed by one or more hardware processors cause managing a plurality of events, the one or more instructions cause:

providing the data model as an input, wherein
the data model comprises a plurality of fact tables and a plurality of dimension tables,
the plurality of dimension tables comprises a plurality of attributes, and
the plurality of fact tables comprises a plurality of fields;

providing one or more new source fields, wherein
the one or more new source fields to be amended in one of a fact table from amongst the plurality of fact tables, and
the one or more new source fields comprises new data comes from existing fields and a new source with multiple source tables;

adding one or more first component keys and one or more component values respective to each of one or more second component keys in the fact table corresponding to the one or more new source fields;

storing the one or more first component keys in a new row of a component table, wherein
the component table further stores description of the one or more component keys, and
the one or more new source fields is ingested without any changes in a background section of the data model;

providing, via the one or more hardware processors, a single field for a quantifiable value which is quantifiable field in the fact table;

adding, via the one or more hardware processors, one or more third component keys to contextualize fact measures, wherein the contextualization indicates a significance of the quantifiable value with respect to a component of one or more components;

highlighting, via the one or more hardware processors, changes in the fact table where a value of the quantifiable value is held, wherein
the quantifiable value is maintained in the component table, and
the component table which qualifies the fact measures is extended to a separate KPI table with use of a relation bridge table;

providing a KPI table, wherein
the KPI table comprising a plurality of KPI calculations, and
the KPI table is controlled by a user using a graphic user interface (GUI);

providing one or more new key performance indicator (KPI) calculations to be reported via the data model, wherein the one or more new KPI calculations includes the plurality of KPI calculations in the KPI table and a new KPI calculation is made of one or more components;

performing calculation corresponding to the new KPI calculation using a generic algorithm and a relational bridge table, wherein
the relational bridge table comprises component key, KPI key, and a sequence number to control the new KPI calculation,
the generic algorithm is available in the data model,
the relational bridge table provides a sequence for each of the one or more components in the new KPI calculation, and
the sequence designates an order of the components to be used in the new KPI calculation; and reporting the calculated new KPI calculation on the GUI.

* * * * *